United States Patent
Ha et al.

(10) Patent No.: US 8,868,071 B2
(45) Date of Patent: Oct. 21, 2014

(54) METHOD AND SYSTEM FOR MANAGING CLOSED SUBSCRIBER GROUP OF A FEMTO BASE STATION IN WIMAX SYSTEM

(75) Inventors: Ji Hye Ha, Anyang-si (KR); Dong Keon Kong, Suwon-si (KR); Sang Jun Moon, Seoul (KR); Sang Do Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 598 days.

(21) Appl. No.: 12/657,758

(22) Filed: Jan. 27, 2010

(65) Prior Publication Data

US 2010/0190498 A1    Jul. 29, 2010

(30) Foreign Application Priority Data

Jan. 28, 2009    (KR) .................... 10-2009-0006412

(51) Int. Cl.
*H04W 4/00* (2009.01)
*H04W 36/00* (2009.01)
*H04W 40/00* (2009.01)
*H04M 1/00* (2006.01)
*H04W 60/00* (2009.01)
*H04W 12/08* (2009.01)
*H04W 84/04* (2009.01)

(52) U.S. Cl.
CPC .............. *H04W 60/00* (2013.01); *H04W 12/08* (2013.01); *H04W 84/045* (2013.01)
USPC ...... 455/435.1; 455/444; 455/448; 455/552.1; 370/328; 370/331

(58) Field of Classification Search
USPC ............ 455/435.1, 444, 448, 552.1; 370/328, 370/331
See application file for complete search history.

(56) References Cited

U.S. PATENT DOCUMENTS

| | | | | |
|---|---|---|---|---|
| 2006/0089987 A1* | 4/2006 | Igarashi et al. | ............... | 709/225 |
| 2009/0093232 A1* | 4/2009 | Gupta et al. | ................... | 455/410 |
| 2009/0262683 A1* | 10/2009 | Khetawat et al. | ............. | 370/328 |
| 2009/0286509 A1* | 11/2009 | Huber et al. | .................. | 455/410 |

* cited by examiner

*Primary Examiner* — Ariel Balaoing

(57) ABSTRACT

A femto base station of a WiMAX system can manage a list of closed subscriber groups (CSGs). A CSG indicator is broadcast. The femto base station receives a registration request message from a mobile station having received the CSG indicator and adds the mobile station to a CSG registration list. The femto base station searches for the mobile station from the CSG registration list if an attach request message is received; and forwards the attach request message to an access service network (ASN) gateway if the mobile station is in the CSG registration list. The femto base station establishes a link message with the mobile station if an attach acceptance message corresponding to the attach request message from the ASN-gateway.

22 Claims, 6 Drawing Sheets

METHOD AND SYSTEM FOR MANAGING CLOSED SUBSCRIBER GROUP OF A FEMTO BASE STATION IN WIMAX SYSTEM

CROSS-REFERENCE TO RELATED APPLICATION(S) AND CLAIM OF PRIORITY

The present application is related to and claims the benefit under 35 U S.C. §119 a of a Korean patent application filed in the Korean Intellectual Property Office on Jan. 28, 2009 and assigned Serial No. 10-2009-0006412, and the entire disclosure of which is hereby incorporated by reference.

TECHNICAL FIELD OF THE INVENTION

The present invention relates to WiMAX systems, and more particularly, to a method and system for configuring and managing a list of groups registered at a femto cell (i.e., closed subscriber groups) if the femto cell is operated in a closed access mode where the femto cell provides services the closed subscriber groups.

BACKGROUND OF THE INVENTION

A femto base station refers to a micro mobile communication base station that is connected to a mobile communication core network via a broadband network installed indoors, for example a home or an office. The term 'femto-' is a prefix denoting a factor of $10^{-15}$.

A femto base station refers to a base station that covers a radius equal to or less than 10 m. A femto base station is advantageous in that it can extend an indoor coverage, improve call quality, and efficiently provide various types of wired and wireless convergence services. A femto base station has a relatively small cell coverage, compared with the macro base station, and can be installed to places that the closed subscriber group (CSG) desires.

In an environment where only conventional macro base stations are installed, a mobile station can easily identify a base station that it intends to access. However, in an environment where femto base stations may be installed with $5000\sim7000/km^2$, it is not easy for a mobile station to identify whether an adjacent base station, which it intends to access, is a macro base station or a femto base station.

In recent years, femto base stations have been operated in a closed access mode where they provide services to only closed subscriber group that are registered to themselves or in an open access mode where they provides services to groups that are not registered to themselves. Femto base stations can also be operated in a semi open access mode that has the features of both the closed access mode and open access mode.

A closed subscriber group (CSG) in 3GPP, supporting a femto base station, stores a white list of femto base stations that can use a SIM or USIM of a mobile station and the unit of a cell supporting a CSG is composed of one or more femto base stations. Therefore, the CSG needs a CSG ID (29 bits) as well as a femto base station ID. However, conventional WiMAX system requires to a one-to-one mapping between a mobile station and a femto base station, without using a CSG ID. Therefore, conventional CSG in 3GPP is using a method that does not match a WiMAX system.

SUMMARY OF THE INVENTION

To address the above-discussed deficiencies of the prior art, it is a primary object to provide a method and system that applies a femto base station to a WiMAX system so that the WiMAX system can be operated in a closed access mode.

The present invention further provides a method and system that can perform operations in terms of a femto base station.

In accordance with an exemplary embodiment of the present invention, the present invention provides a method for initiating a service in a femto base station of a WiMAX system, the method including: broadcasting a closed subscriber group (CSG) indicator; receiving a registration request message from a mobile station having received the CSG indicator; adding the mobile station to a CSG registration list; searching for the mobile station from the CSG registration list if an attach request message is received; forwarding the attach request message to an access service network (ASN) gateway if the mobile station is in the CSG registration list; and establishing a link message with the mobile station if an attach acceptance message corresponding to the attach request message from the ASN-gateway.

In accordance with another exemplary embodiment of the present invention, the present invention provides a femto base station of a WiMAX system that: broadcasts a closed subscriber group (CSG) indicator; receives a registration request message from a mobile station having received the CSG indicator; adds the mobile station to a CSG registration list; searches for the mobile station from the CSG registration list if an attach request message is received; forwards the attach request message to an access service network (ASN) gateway if the mobile station is in the CSG registration list; and establishes a link message with the mobile station if an attach acceptance message corresponding to the attach request message from the ASN-gateway.

In accordance with another exemplary embodiment of the present invention, the present invention provides a WiMAX system including a femto base station, a mobile station, and an access service network (ASN) gateway.

The femto base station broadcasts a closed subscriber group (CSG) indicator; adds a mobile station to a CSG registration list if a registration request message is received; searches for the mobile station from the CSG registration list if an attach request message is received; forwards the attach request message if the mobile station is in the CSG registration list; and establishes a link message with the mobile station if an attach acceptance message corresponding to the attach request message.

The mobile station receives the CSG indicator from the femto base station, and transmits the registration request message to the femto base station. The mobile station also transmits the attach request message to the femto base station.

The ASN gateway receives the attach request message from the femto base station and transmits an attach acceptance message corresponding to the attach request message to femto base station.

Before undertaking the DETAILED DESCRIPTION OF THE INVENTION below, it may be advantageous to set forth definitions of certain words and phrases used throughout this patent document:

the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
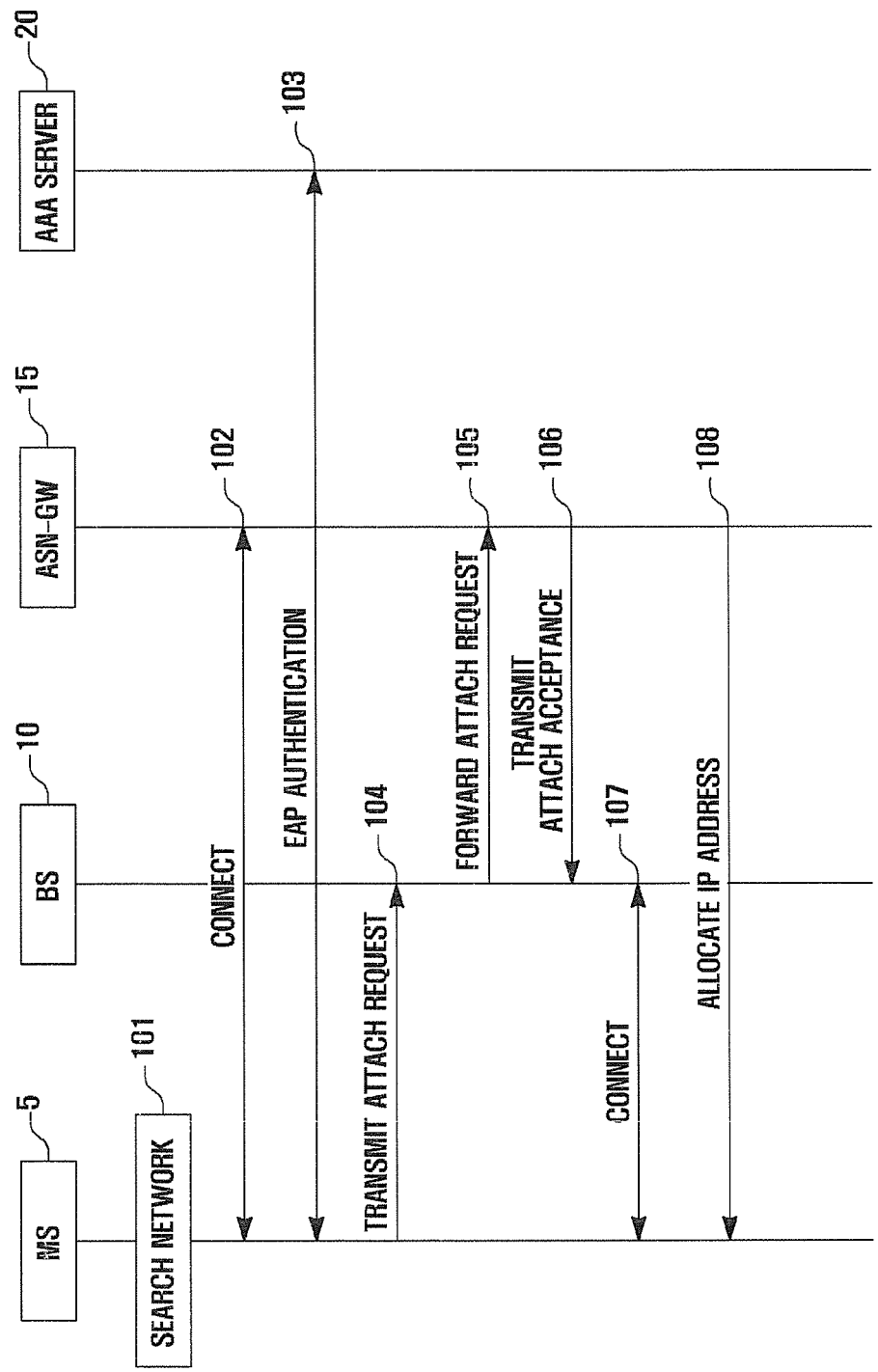
FIG. 1 illustrates a signal flow chart that describes a method for initiating a service in a conventional WiMAX system.

FIGS. 1 through 6, discussed below, and the various embodiments used to describe the principles of the present disclosure in this patent document are by way of illustration only and should not be construed in any way to limit the scope of the disclosure.

Those skilled in the art will understand that the principles of the present disclosure may be implemented in any suitably arranged wireless communication system.

Prior to explaining the embodiments of the present invention, terminologies will be defined for the present description below. The terms or words described in the present description and the claims should not be limited by a general or lexical meaning, instead should be analyzed as a meaning and a concept through which the inventor defines and describes the present invention at his most effort, to comply with the idea of the present invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

FIG. 1 illustrates a signal flow chart that describes a method for initiating a service in a conventional WiMAX system.

The WiMAX system provides services through a current macro base station.

Referring to FIG. 1, a mobile station (MS) 5 searches 101 for peripheral networks, i.e., base stations. The mobile station selects one of the searched base stations that has the highest received signal strength indicator, establishes a communication link with the selected base station 10, and is connected 102 to an access service network gate way (ASN-GW) 15 via the selected base station 10. The mobile station 5 is connected to an authentication, authorization and accounting (AAA) server 20 and performs an EAP authentication 103 of the IEEE 802.11i.

When successfully completing the EAP authentication 103, the mobile station transmits an attach request message 104 to the base station 10. The base station forwards the attach request message 105 to the ANS-GW 15. After receiving the attach request message 105, the ANS-GW 15 performs preset processes and then determines whether to allow for the access of the mobile station 5.

If the ANS-GW 15 determines whether to allow for the access of the mobile station 5, it transmits an attach acceptance message 106 to the base station 10. After receiving the attach acceptance message 106 from the base station 10, the mobile station 5 establishes a communication channel 107 with the base station 10. The ASN-GW 15 allocates an Internet protocol (IP) address 108 to the mobile station 5 via the base station 10 and provides a service thereto.

The method described in FIG. 1 has been explained where the WiMAX system provides the services through a macro base station.

If a femto base station is applied to the WiMAX system, the WiMAX system requires the concept of a closed subscriber group (CSG) only allowing for the access of the registered mobile stations, which is not appropriate to the method. In order to resolve the problem, the 3GPP system is implemented in such a way that a white list of femto base stations is used in a subscriber identity module (SIM) or universal subscriber identity module (USIM) to manage CSGs. Since the unit of a CSG cell is composed of a plurality of femto base stations, a CSG ID is needed in addition to a base station identifier (BSID) of a femto base station. Therefore, if a method for implementing a 3GPP system is dedicated to the WiMAX system, it can follow the features of the WiMAX system that requires a one-to-one mapping between the mobile station and the femto base station, without using the DSG ID.

Figure 2:
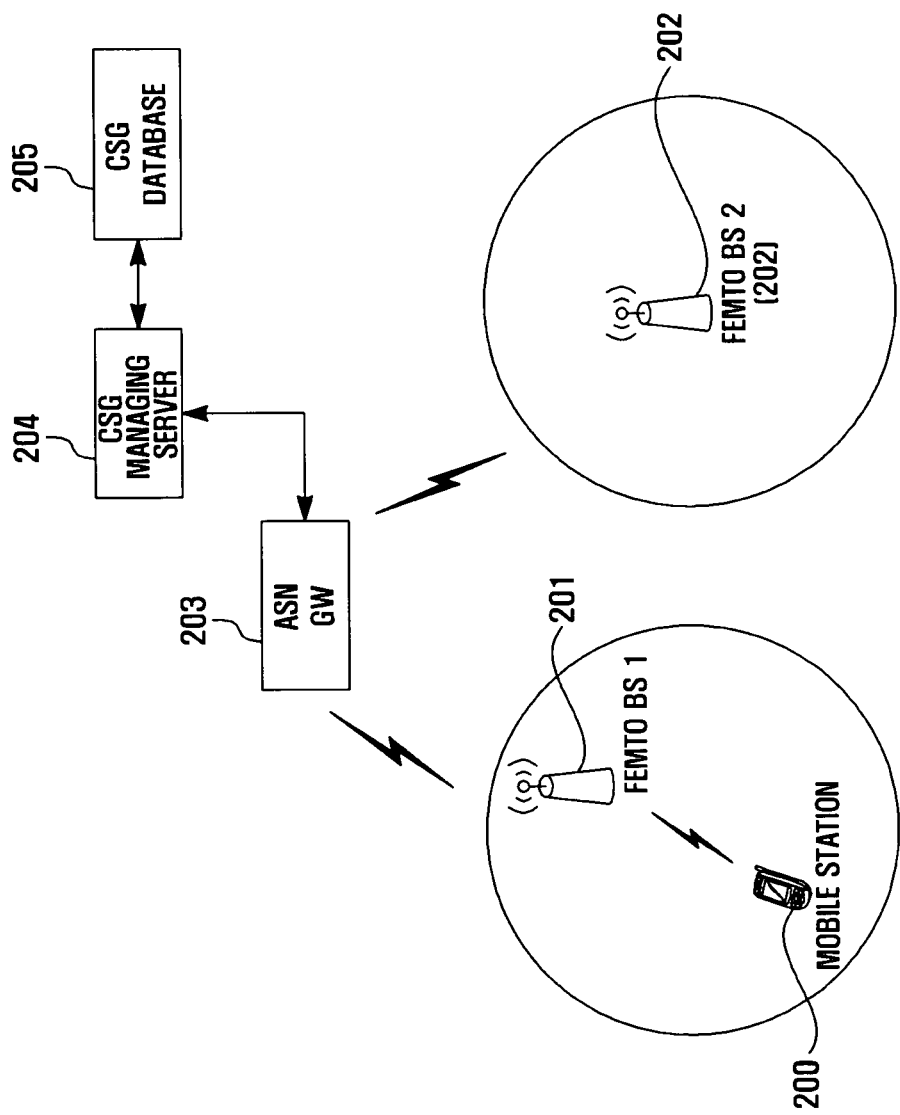
FIG. 2 illustrates a configuration of a WiMAX system including a femto base station according to an embodiment of the present invention.

FIG. 2 illustrates the configuration of a WiMAX system including a femto base station according to an embodiment of the present invention.

Referring to FIG. 2, the WiMAX system includes a mobile station 200, femto base stations 201 and 202, an access service network gate way (ASN-gateway) 203, a CSG managing server 204, and a CSG database 205.

The femto base stations 201 and 202 refer to base stations that has coverage in a cell radius equal to or less than 10 m. In an embodiment of the present invention, the femto base stations 201 and 202 are each operated in a closed access mode where they can provide services to the mobile station 200 registered at the femto base stations, which is called a closed subscriber group (CSG). The femto base stations 201 and 202 broadcast their base station identifiers (BSIDs) containing CSG indicators to the mobile stations, respectively. The BSID may further contain information indicating that its base station is a femto base station. In another embodiment, the CSG indicator may be broadcast, separating from the BSID.

The ASN-gateway 203 serves as a gateway among the femto base stations 201 and 202 and an IP core network. In an embodiment of the present invention, the ASN-gateway 203 serves to forward a registration request message, transmitted from a base station, to the CSG managing server 204. Also, the ASN-gateway 203 determines whether to allow the mobile station 200 to access a network.

The CSG managing server 204 is the higher ranked element for managing CSGs. The CSG managing server 204 manages the CSG database 205. Alternatively, the CSG managing server 204 may be a logical configuration element and implemented with an authentication, authorization and accounting (AAA) server.

The CSG database 205 stores BSIDs of the femto base stations 201 and 202 supporting the CSGs, MAC addresses of mobile stations that are requested to be registered, MAC addresses of registered mobile stations, and so forth.

It should be understood that the embodiment may be modified in such a way that the ASN-gateway 203 determines whether to allow the mobile station 200 to access a network, and the femto base stations 201 and 202, allowed for the access to the network, directly transmit a registration request message to the CSG managing server 204 without passing through the ASN-gateway 203.

Figure 3:
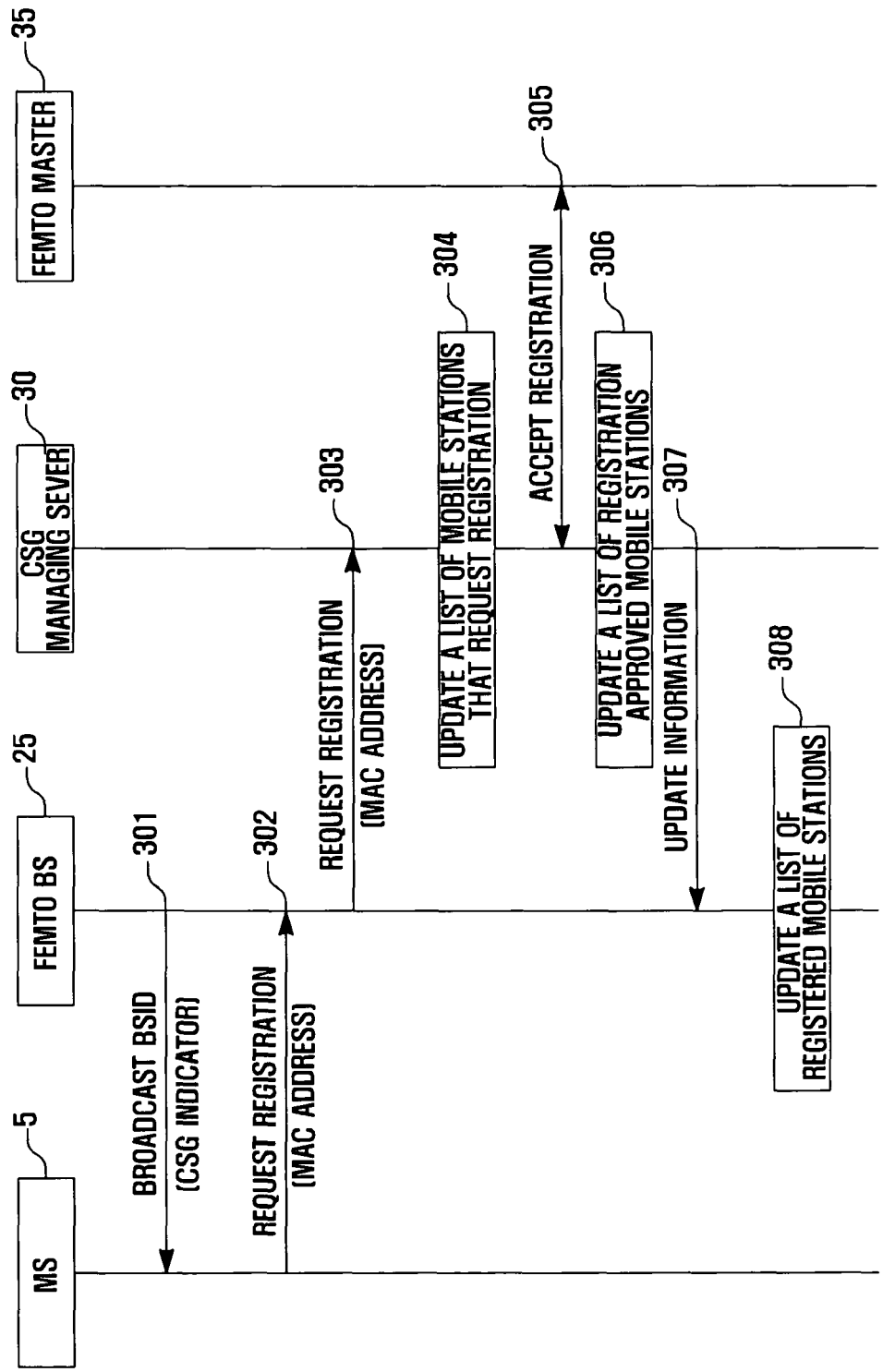
FIG. 3 illustrates a signal flow chart that describes a method for registering CSG in a base station according to an embodiment of the present invention.

FIG. 3 illustrates a signal flow chart that describes a method for registering CSG in a base station according to an embodiment of the present invention. In an embodiment of the present invention, the base station is implemented with a femto base station that is operated in a closed access mode where it provides services to only CSGs.

Referring to FIG. 3, the femto base station 25 broadcasts a BSID 301 containing a CSG indicator. The BSID may further contain information indicating that its base station is a femto base station.

Alternatively, in another embodiment, the CSG indicator may be broadcast, separating from the BSID.

A mobile station 5 receives the BSID and identifies the CSG indicator contained therein. After that, the mobile station 5 transmits a registration request message 302 to the femto base station. The registration request message 302 contains an MAC address of the mobile station 5. Information to identify mobile stations may be implemented with international mobile station identity (IMSI), MAC address, and the like. A mobile station supporting WiMAX system may not be allocated with IMSI. That is, it is preferable to identify a mobile station supporting WiMAX system, based on an MAC address.

The femto base station 25 forwards the registration request message 303, transmitted from the mobile station 5, to the CSG managing server 30. The CSG managing server 30 adds the mobile station transmitting the registration request message to a list of mobile stations requested to be registered, thereby updating the list of mobile stations 304 in the CSG database. After that, a femto master 35, i.e., a service administrator, determines whether to allow the registration of a mobile station requested to be registered, and transmits a registration acceptance message 305 to the CSG managing server.

The CSG managing server 30 receives the registration acceptance message and updates a list of registration accepted mobile stations 306. The CSG managing server 30 transmits the registration request message 307 to the femto base station 25. The femto base station 25 adds the mobile station which transmitted the registration request message to its list of mobile stations registered as CSGs, thereby updating the list of registered mobile stations 308. In particular, it is preferable that the list of registered mobile stations may be implemented with an MAC address to identify mobile stations.

Figure 4:
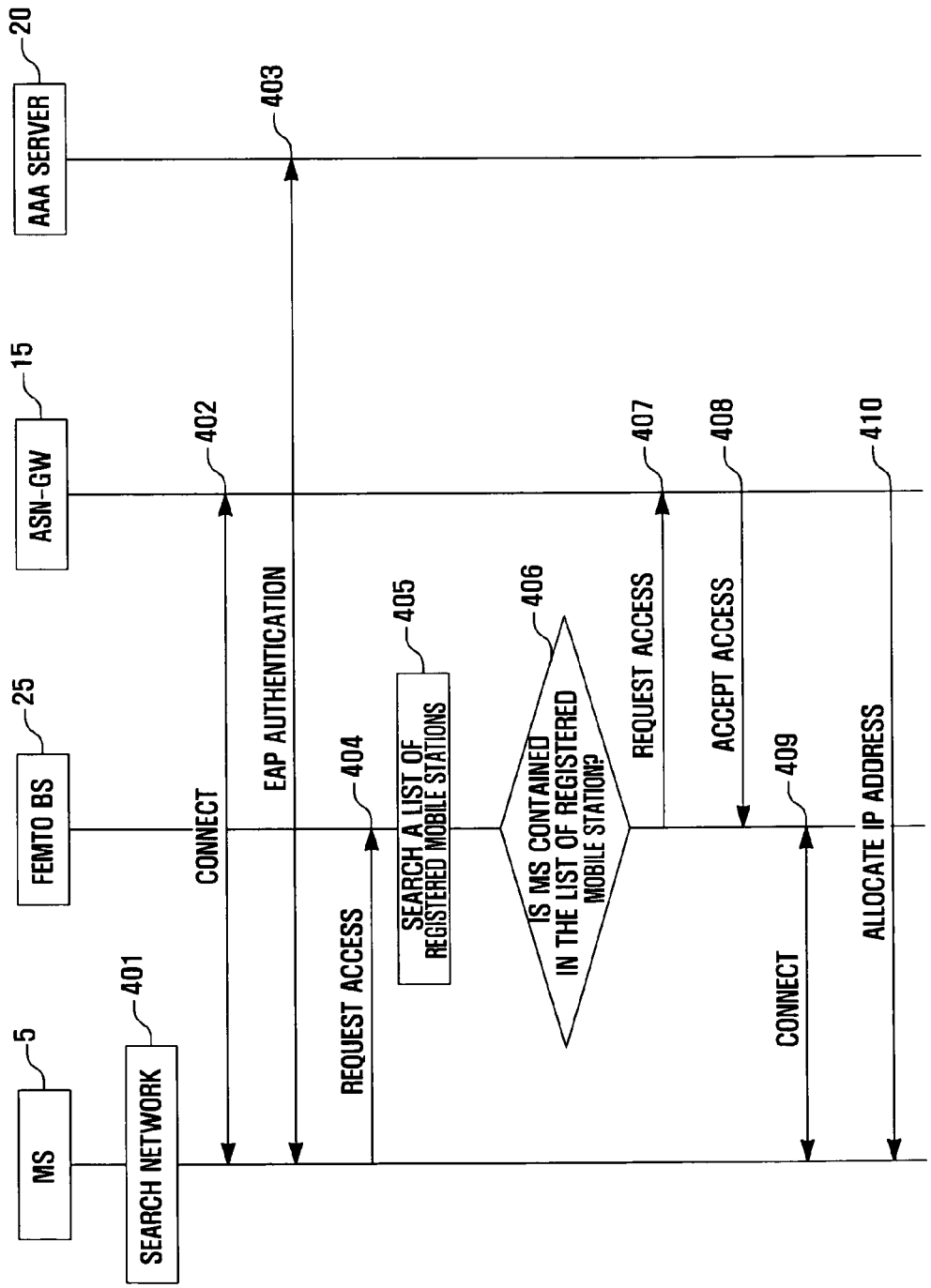
FIG. 4 illustrates a signal flow chart that describes a method for initiating a CSG service in a WiMAX system including a femto base station according to an embodiment of the present invention.

FIG. 4 illustrates a signal flow chart that describes a method for initiating a CSG service in a WiMAX system including a femto base station according to an embodiment of the present invention.

Referring to FIG. 4, a mobile station (MS) 5 searches 401 for peripheral networks, i.e., femto base stations. The mobile station 5 selects one of the searched femto base stations that has the highest received signal strength indicator, establishes a communication link with the selected femto base station 25, and is connected 402 to an access service network gate way (ASN-GW) 15 via the selected femto base station 25. The mobile station 5 is connected to an authentication, authorization and accounting (AAA) server 20 and performs an EAP authentication 403 of the IEEE 802.11i.

When successfully completing the EAP authentication 403, the mobile station 5 transmits an attach request message 404 to the femto base station 25. The femto base station 25 receives the attach request message and searches for a list of registered mobile stations 405 stored therein. The femto base station 25 determines whether the mobile station 5 transmitting the attach request message exists in the list of registered mobile stations 406. If the mobile station 5 transmitting the attach request message exists in the list of registered mobile stations, the femto base station 25 forwards the attach request message 407, transmitted from the mobile station 5, to the ANS-GW 15. After receiving the attach request message 407, the ANS-GW 15 performs preset processes and then determines whether to allow for the access of the mobile station.

If the ANS-GW 15 determines to allow for the access of the mobile station, it transmits an attach acceptance message 408 to the femto base station 25. After receiving the attach acceptance message from the femto base station 25, the mobile station 5 establishes a communication channel (409) with the femto base station 25. The ASN-GW 15 allocates an Internet protocol (IP) address 410 to the mobile station 5 via the base station and provides a service thereto.

In another embodiment, the method may be modified in such a way that the EPA authentication 403 may be performed after step 409 where the mobile station establishes a communication channel with the femto base station. In that case, steps 404~409 are performed, irrespective of the result of EPA authentication. After that, if the communication channel has successfully established at 409, the EPA authentication is performed.

Figure 5:
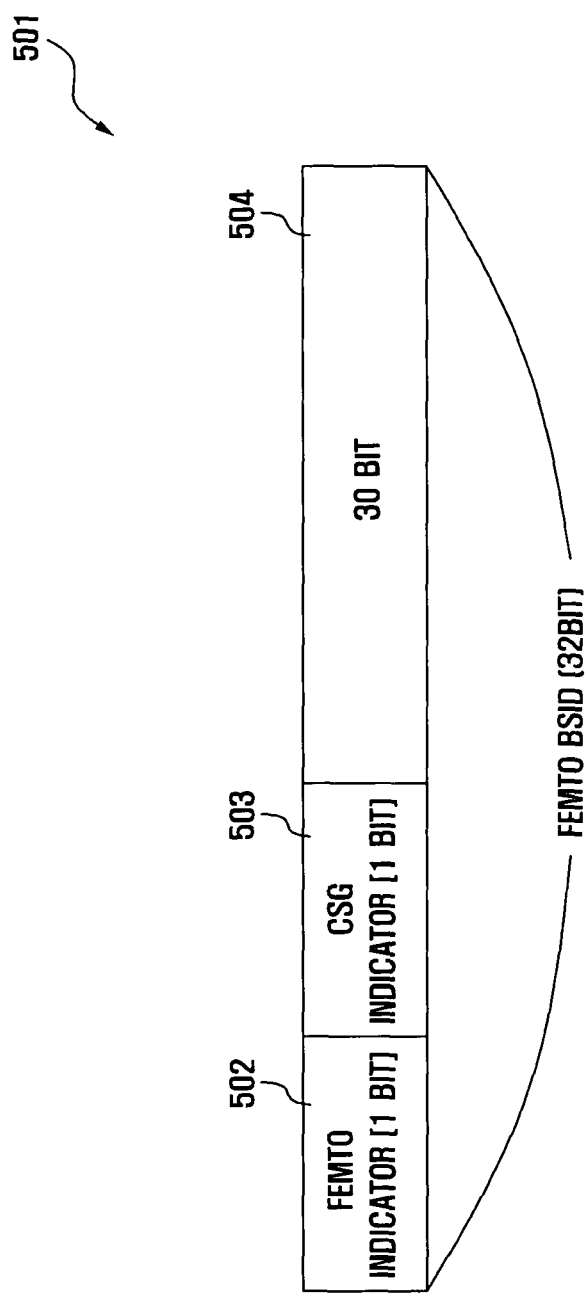
FIG. 5 illustrates a BSID format for supporting CSG, according to an embodiment of the present invention.

FIG. 5 illustrates a BSID format for supporting CSG according to an embodiment of the present invention. In an embodiment of the present invention, the BSID contains a 4-octet IPv4 address.

Referring to FIG. 5, the BSID 501 serves as an identifier of a femto base station and is composed of 32 bits.

The BSID 501 contains a femto identifier 502 indicating that its base station is a femto base station, where the femto identifier 502 is composed of 1 bit.

The BSID 501 also contains a CSG indicator 503, where the CSG indicator 503 is composed of 1 bit. A mobile station receives the BSID containing the CSG indicator 503 and transmits a registration request message to a mobile station that broadcast the registration request message.

The BSID 502 further contains inherent information capable of identifying base stations in an area 504 of 30 bits.

Figure 6:
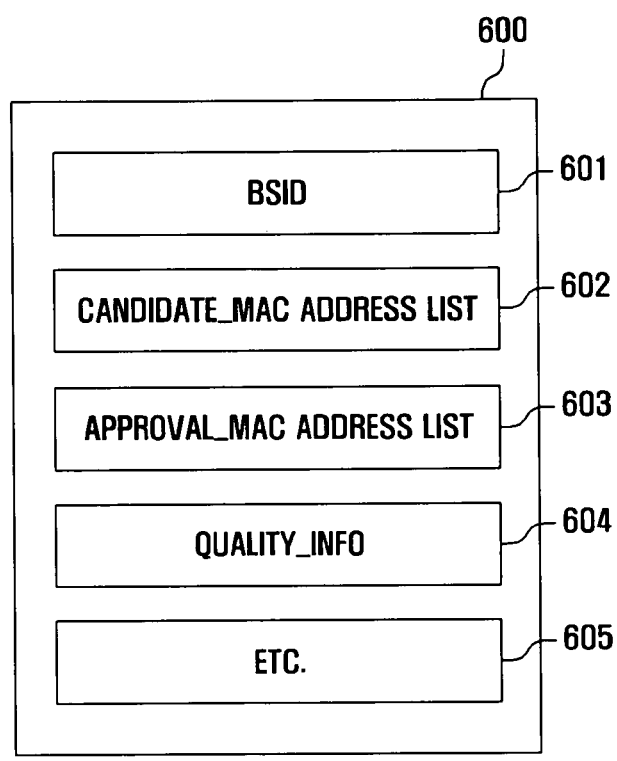
FIG. 6 illustrates a CSG database storing information, according to an embodiment of the present invention.

FIG. 6 illustrates a CSG database storing information according to an embodiment of the present invention.

Referring to FIG. 6, the CSG database stores information 600 composed of BSID 601, a list of registration request mobile stations Candidate_MAC address list 602, a list of registration approval mobile stations Approval_MAC address list 603, quality information Quality_Info 604, and miscellaneous data 605.

The CSG database stores information regarding a plurality of femto base stations. The femto base stations are identified by the BSID 601. The list of registration request mobile stations Candidate_MAC address list 602 and the list of registration approval mobile stations Approval_MAC address list 603 can be implemented with the international mobile station identity (IMSI) or the MAC address of a mobile station. It is preferable that mobile stations are identified by the MAC address. Therefore, it is also preferable that the Candidate_MAC address list 602 and the Approval_MAC address list 603 are implemented with the MAC address of a mobile station.

The quality information Quality_Info 604 stores information regarding received and transmitted signal strength indicators by mobile stations. If information regarding signal transmit/reception strength such as a handover is required, reference information may be used.

As described above, the method and system for managing a CSG of a femto base station in a WiMAX system, according to the present invention, can provide CSG services without the use of a CSG ID and a CSG cell. The method and system simplifies the procedure of writing a registration list of services between a mobile station and a femto base station, through an automatic service registration procedure, so that the femto base station manages a supporting list and determines whether it can support a service. This can reduce the resource use.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for initiating a service in a femto base station of a system, the method comprising:
broadcasting a closed subscriber group (CSG) indicator;
receiving a registration request message from a mobile station having received the CSG indicator, the registration request message including information for specifying the mobile station;
forwarding the registration request message to a CSG managing server;
adding, if the femto base station receives a registration acceptance message corresponding to the registration request message from the CSG managing server, the information for specifying the mobile station to a CSG registration list stored in the femto base station;
searching for the mobile station from the CSG registration list if an attach request message is received from the mobile station;
forwarding the attach request message to an access service network (ASN) gateway if the mobile station is in the CSG registration list; and
establishing a link message with the mobile station if an attach acceptance message corresponding to the attach request message from the ASN gateway,
wherein the information for specifying the mobile station is added to the CSG registration list after receiving the registration acceptance message.

2. The method of claim 1, further comprising:
receiving an Internet protocol (IP) address from the ASN gateway; and
allocating the IP address to the mobile station.

3. The method of claim 1, wherein the information for specifying the mobile station contains a Media Address Control (MAC) address of the mobile station.

4. The method of claim 3, wherein adding comprises:
adding the MAC address of the mobile station to the CSG registration list.

5. The method of claim 1, wherein broadcasting a closed subscriber group (CSG) indicator comprises:
broadcasting a base station identifier (BSID) contained in the CSG indicator.

6. The method of claim 5, wherein the BSID contains information regarding a femto base station.

7. The method of claim 1, wherein the attach request message contains a Media Address Control (MAC) address of the mobile station.

8. A femto base station of a WiMAX system, the femto base station configured to:
broadcast a closed subscriber group (CSG) indicator;
receive a registration request message from a mobile station having received the CSG indicator, the registration request message including information for specifying the mobile station;
forward the registration request message to a CSG managing server;
add, if the femto base station receives a registration acceptance message corresponding to the registration request message from the CSG managing server, the information for specifying the mobile station to a CSG registration list stored in the femto base;
search for the mobile station from the CSG registration list if an attach request message is received from the mobile station;
forward the attach request message to an access service network (ASN) gateway if the mobile station is in the CSG registration list; and
establish a link message with the mobile station if an attach acceptance message corresponding to the attach request message from the ASN-gateway,
wherein the information for specifying the mobile station is added to the CSG registration list after receiving the registration acceptance message.

9. The femto base station of claim 8, wherein the femto base station further is configured to:
receive an Internet protocol (IP) address from the ASN gateway; and
allocate the IP address to the mobile station.

10. The femto base station of claim 8, wherein the information for specifying the mobile station includes a Media Address Control (MAC) address of the mobile station.

11. The femto base station of claim 10, wherein the femto base station is configured to add the MAC address of the mobile station to the CSG registration list.

12. The femto base station of claim 8, wherein the femto base station is configured to broadcast a base station identifier (BSID) contained in the CSG indicator, thereby broadcasting the CSG indicator.

13. The femto base station of claim 12, wherein the BSID includes information regarding a femto base station.

14. The femto base station of claim 8, wherein the attach request message includes a Media Address Control (MAC) address of the mobile station.

15. A system comprising a plurality of femto base stations:
at least one femto base station configured to:
broadcast a closed subscriber group (CSG) indicator;
receive a registration request message from a mobile station having received the CSG indicator, the registration request message including information for specifying the mobile station;
forward the registration request message to a CSG managing server;
add, if the femto base station receives a registration acceptance message corresponding to the registration request message from the CSG managing server, the information for specifying the mobile station to a CSG registration list stored in the femto base station;

search for the mobile station from the CSG registration list if an attach request message is received from the mobile station;

forward the attach request message if the mobile station is in the CSG registration list; and establish a link message with the mobile station if an attach acceptance message corresponding to the attach request message, the mobile station configured to receive the CSG indicator from the femto base station, transmit the registration request message to the femto base station, and transmit the attach request message to the femto base station; and an access service network (ASN) gateway configured to receive the attach request message from the femto base station and transmit an attach acceptance message corresponding to the attach request message to femto base station, wherein the information for specifying the mobile station is added to the CSG registration list after receiving the registration acceptance message.

16. The system of claim 15, wherein the at least one femto base station is configured to:

receive an Internet protocol (IP) address from the ASN gateway; and allocate the IP address to the mobile station.

17. The system of claim 15, wherein the information for specifying the mobile station includes a Media Address Control (MAC) address of the mobile station.

18. The system of claim 15, wherein the CSG registration list includes a MAC address of the mobile station contained in the registration request message.

19. The system of claim 15, wherein the at least one femto base station is configured to broadcast a base station identifier (BSID) contained in the CSG indicator, thereby broadcasting the CSG indicator.

20. The system of claim 15, wherein the BSID includes information regarding a femto base station.

21. The system of claim 15, wherein the attach request message includes a Media Address Control (MAC) address of the mobile station.

22. The system of claim 15, further comprising:

a CSG database comprising base station identifiers (BSIDs) of base stations, a list of registration request mobile stations, a list of registration approval mobile stations, and quality information.

* * * * *